US012692432B2

(12) United States Patent 
Nojima et al.

(10) Patent No.: US 12,692,432 B2 
(45) Date of Patent: Jul. 28, 2026

(54) QUANTUM DOT SURFACE TREATMENT METHOD AND SURFACE TREATMENT APPARATUS

(71) Applicant: SHIN-ETSU CHEMICAL CO., LTD., Tokyo (JP)

(72) Inventors: Yoshihiro Nojima, Annaka (JP); Shinji Aoki, Annaka (JP); Kazuya Tobishima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/254,464

(22) PCT Filed: Nov. 30, 2021

(86) PCT No.: PCT/JP2021/043720 
§ 371 (c)(1), 
(2) Date: May 25, 2023

(87) PCT Pub. No.: WO2022/124127 
PCT Pub. Date: Jun. 16, 2022

(65) Prior Publication Data 
US 2024/0010911 A1 Jan. 11, 2024

(30) Foreign Application Priority Data 
Dec. 7, 2020 (JP) ................................. 2020-202853

(51) Int. Cl. 
*C09K 11/02* (2006.01) 
*B82Y 20/00* (2011.01) 
(Continued)

(52) U.S. Cl. 
CPC .......... *C09K 11/025* (2013.01); *C09D 183/10* (2013.01); *C09K 11/0883* (2013.01); 
(Continued)

(58) Field of Classification Search 
CPC ................................. B82Y 20/00; B82Y 40/00 
See application file for complete search history.

(56) References Cited

U.S. PATENT DOCUMENTS 7,144,458 B2 * 12/2006 Zehnder ................ C30B 29/605 
117/957 
8,394,976 B2 * 3/2013 Pickett ...................... C09C 3/08 
977/774 
(Continued)

FOREIGN PATENT DOCUMENTS

CN 102272217 A 12/2011 
JP 2013-544018 A 12/2013 
(Continued)

OTHER PUBLICATIONS

Feb. 8, 2022 International Search Report issued in International Patent Application No. PCT/JP2021/043720. 
(Continued)

*Primary Examiner* — Alex A Rolland 
(74) *Attorney, Agent, or Firm* — Oliff PLC

(57) ABSTRACT

A quantum dot surface treatment method including continuously supplying a solution containing a silicone compound and a quantum dot having a surface to which a ligand having a coordinating substituent and a reactive substituent is coordinated by virtue of the coordinating substituent, to a reaction flow path made of a material that transmits light, and emitting light to the reaction flow path, so that the silicone compound and the reactive substituent undergo a photopolymerization reaction, thereby coating the surface of the quantum dot with the silicone compound. Thus, the quantum dot surface treatment method is provided that enables to, even in the case of performing surface treatment using a large amount of solution, obtain a quantum dot having excellent stability with high productivity by stably 
(Continued)

10 coating the surface of the quantum dot with the silicone compound, and provide a wavelength conversion material with high reliability.

9 Claims, 1 Drawing Sheet

(51) Int. Cl.

| | |
|---|---|
| *B82Y 40/00* | (2011.01) |
| *C09D 183/10* | (2006.01) |
| *C09K 11/08* | (2006.01) |
| *C09K 11/88* | (2006.01) |

(52) U.S. Cl.
CPC ............. *C09K 11/883* (2013.01); *B82Y 20/00* (2013.01); *B82Y 40/00* (2013.01)

(56) References Cited

U.S. PATENT DOCUMENTS

| | | | |
|---|---|---|---|
| 2002/0083888 A1 | 7/2002 | Zehnder et al. | |
| 2004/0091710 A1 | 5/2004 | Bawendi et al. | |
| 2010/0113813 A1 | 5/2010 | Pickett et al. | |
| 2010/0167011 A1 | 7/2010 | Dubrow | |
| 2015/0049491 A1* | 2/2015 | Venkataraman | B29C 45/1671 |
| | | | 977/774 |
| 2015/0267106 A1 | 9/2015 | Pillay Narrainen et al. | |
| 2016/0327690 A1 | 11/2016 | Tokinoya et al. | |
| 2017/0162764 A1 | 6/2017 | Kan et al. | |
| 2017/0276300 A1 | 9/2017 | Koole et al. | |
| 2017/0277002 A1 | 9/2017 | Yamada et al. | |
| 2018/0040750 A1 | 2/2018 | Bower et al. | |
| 2018/0282617 A1 | 10/2018 | Qiu et al. | |
| 2018/0371312 A1 | 12/2018 | Dirscherl | |
| 2019/0077954 A1 | 3/2019 | Tangirala et al. | |
| 2019/0144689 A1 | 5/2019 | Yamada et al. | |
| 2019/0221722 A1 | 7/2019 | Dirscherl et al. | |
| 2019/0322926 A1 | 10/2019 | Chae et al. | |
| 2020/0369954 A1 | 11/2020 | Qiu et al. | |

FOREIGN PATENT DOCUMENTS

| | | |
|---|---|---|
| JP | 5356318 B2 | 12/2013 |
| JP | 5900720 B1 | 4/2016 |
| JP | 2016-111292 A | 6/2016 |
| JP | 2017-021322 A | 1/2017 |
| JP | 2017-514299 A | 6/2017 |
| JP | 2017-537351 A | 12/2017 |
| JP | 2017-538244 A | 12/2017 |
| JP | 2019-501407 A | 1/2019 |
| JP | 6592540 B2 | 10/2019 |
| JP | 2020-530133 A | 10/2020 |
| JP | 2020-532049 A | 11/2020 |
| KR | 10-2011-0091740 A | 8/2011 |
| WO | 2016/124814 A1 | 8/2016 |
| WO | 2021/241071 A1 | 12/2021 |

OTHER PUBLICATIONS

Jun. 13, 2023 International Preliminary Report on Patentability issued in International Patent Application No. PCT/JP2021/043720.

May 30, 2025 Office Action and Search Report issued in Chinese Patent Application No. 202180080828.0.

Jan. 26, 2026 Office Action issued in Chinese Patent Application No. 202180080828.0.

Feb. 23, 2026 Office Action issued in Korean Patent Application No. 2023-7018325.

Mar. 31, 2026 Decision on Refusal issued in Chinese Patent Application No. 202180080828.0.

* cited by examiner

10
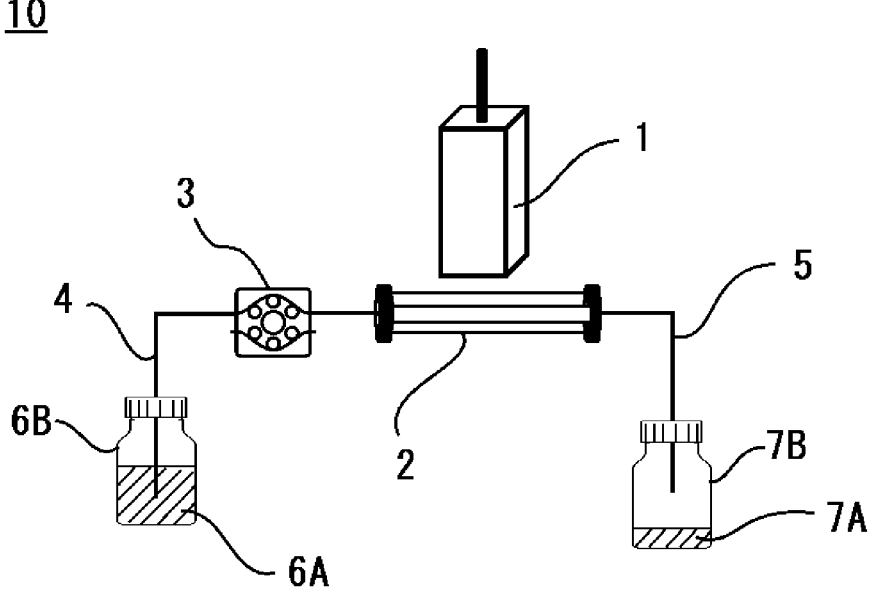

QUANTUM DOT SURFACE TREATMENT METHOD AND SURFACE TREATMENT APPARATUS

TECHNICAL FIELD

The present invention relates to a quantum dot surface treatment method and surface treatment apparatus.

BACKGROUND ART

Semiconductor crystal particles with nanosized particle diameters are called quantum dots, and excitons generated upon light absorption are confined in a nanosized region, so that the semiconductor crystal particles have discrete energy levels, and further the band gap varies depending on the particle diameter. Due to these effects, the fluorescence emission by quantum dots is brighter and more efficient than that by common fluorescent materials and exhibits sharp light emission.

Moreover, based on such nature that the band gap varies depending on the particle diameter, quantum dots are characterized in that the emission wavelength is controllable and are expected to be applied as a wavelength conversion material for solid-state lighting and displays. For example, the use of quantum dots as a wavelength conversion material in a display enables to realize a wider color range and lower power consumption than conventional fluorescent materials.

There has been proposed a method of assembling quantum dots for use as a wavelength conversion material, in which quantum dots are dispersed in a resin material and the resin material containing the quantum dots is laminated with a transparent film and then incorporated into a backlight unit as a wavelength conversion film (Patent Document 1). Furthermore, there has also been proposed an application to image elements with high efficiency and excellent color reproducibility by using quantum dots as a color filter material so that the quantum dots absorb blue monochromatic light from a backlight unit and emit red or green light to thereby function as a color filter and a wavelength conversion material (Patent Document 2).

CITATION LIST

Patent Literature

Patent Document 1: JP2013-544018A
Patent Document 2: JP2017-21322A
Patent Document 3: JP5356318B2
Patent Document 4: JP6592540B2
Patent Document 5: JP5900720B2

SUMMARY OF INVENTION

Technical Problem

However, since quantum dots have particle diameters as small as nanometer size, the specific surface area is large. Accordingly, since the surface energy is high and the surface activity is high, it is easy to become unstable. Surface defects are likely to occur due to dangling bonds, oxidation reaction, and the like on the quantum dot surfaces, which causes deterioration of the fluorescence emission properties. These are particularly problems for cadmium-free quantum dots and perovskite-type quantum dots. It is known that currently obtained quantum dots have such stability problems and cause deterioration of emission properties due to heat, humidity, photoexcitation, or the like, adversely affecting the device. Furthermore, quantum dots are typically hydrophobic and have poor compatibility with polar resin materials such as silicone, causing a serious problem of aggregation.

Since changes in the emission properties of quantum dots over time and the occurrence of aggregation cause defects such as color unevenness, emission unevenness, and dot omission in a display, improving the stability of quantum dots is an important issue.

Against such problems, there have been examined a method in which quantum dot surfaces are coated with a polymer, an inorganic oxide, or the like (Patent Documents 3 and 4), and a method in which a gas-barrier film with low oxygen and humidity permeability is used to enhance stability of the quantum dots (Patent Document 5).

However, in the step of coating quantum dot surfaces in order to enhance the stability as in the inventions described in Patent Documents 3 and 4, the emission properties of the quantum dots cannot be maintained, which results in a problem of deteriorating the properties. In addition, the stabilization with a barrier film as described in Patent Document 4 also has a problem that deterioration due to diffusion of oxygen and water vapor from the film end surface progresses. Further, thin wavelength conversion materials are demanded for mobile applications such as tablets and smartphones; however, since the use of barrier films is required, there is a limit to reducing the thickness of the wavelength conversion material. Moreover, in applications to color filters and μLEDs, it is difficult to use a barrier film or the like due to the implementation method, which becomes a problem in applications to applications other than films.

Thus, as a method of obtaining highly reliable and stable quantum dots by coating quantum dot surfaces under a mild condition that does not cause deterioration of the quantum dots, the present inventors have found a method in which quantum dot surfaces are substituted by a ligand having a reactive substituent, and a silicone compound having a substituent polymerizable with a reactive functional group of the ligand is immobilized on the quantum dot surfaces by a photopolymerization reaction for coating the quantum dot surfaces. However, it has been revealed that, in the case of performing this method with the solution contained in a container such as a flask (so-called batch processing), if the reaction is performed with an increased amount of the solution in order to increase the throughput, a problem that the surface is not completely coated occurs.

The present invention has been made in view of problems as described above, and an object thereof is to provide a quantum dot surface treatment method that enables to, even in the case of performing quantum dot surface treatment using a large amount of solution, obtain a quantum dot having excellent stability with high productivity by stably coating the quantum dot surface with a silicone compound, and provide a wavelength conversion material with high properties and reliability by improving the compatibility between the quantum dot and the resin material, as well as a surface treatment apparatus that can be used for the surface treatment method.

Solution to Problem

The present invention has been made to achieve the above object and provides a quantum dot surface treatment method comprising continuously supplying a solution containing a silicone compound and a quantum dot having a surface to which a ligand having a coordinating substituent and a reactive substituent is coordinated by virtue of the coordinating substituent, to a reaction flow path made of a material that transmits light, and emitting light to the reaction flow path, so that the silicone compound and the reactive substituent undergo a photopolymerization reaction, thereby coating the surface of the quantum dot with the silicone compound.

According to the quantum dot surface treatment method as described above, even in the case of performing surface treatment using a large amount of solution, it is possible to stably coat the surface of the quantum dot with the silicone compound, which enables to provide a wavelength conversion material with high reliability.

At this time, the quantum dot surface treatment method can be provided in which the coordinating substituent is one or more kinds of an amino group, a thiol group, a carboxyl group, a phosphino group, and a quaternary ammonium salt.

The coordinating substituent as described above has excellent coordinating properties to the quantum dot surface, is highly effective in suppressing desorption of the ligand from the quantum dot, and enables a stable and high reaction with the silicone compound.

At this time, the quantum dot surface treatment method can be provided in which the reactive substituent is one or more kinds of a vinyl group, an acrylic group, a methacryl group, a thiol group, an epoxy group, and an oxetanyl group.

The reactive substituent as described above enables a stable and high reaction with the silicone compound.

At this time, the quantum dot surface treatment method can be provided in which the reaction flow path is tubular, and a concentration of the solution and/or a diameter of the reaction flow path are adjusted such that a transmittance of the light that transmits through the reaction flow path is at least 0.1% or more.

Thus, coating with the silicone compound can be performed more stably.

The present invention also provides a quantum dot surface treatment apparatus comprising: a solution supplying unit capable of adjusting a supply flow rate of a solution containing a quantum dot and a reactive compound that reacts with a surface of the quantum dot; a light source that emits light for allowing the quantum dot and the reactive compound to undergo a photoreaction; and a reaction flow path that allows the quantum dot and the reactive compound in the solution supplied by the solution supplying unit to undergo a photoreaction therein, the reaction flow path being made of a material capable of transmitting light emitted from the light source.

According to the quantum dot surface treatment apparatus as described above, even in the case of performing surface treatment using a large amount of solution, it is possible to stably coat the surface of the quantum dot with the silicone compound.

Advantageous Effects of Invention

As described above, according to the quantum dot surface treatment method of the present invention, even in the case of performing surface treatment using a large amount of solution, it is possible to stably coat the surface of the quantum dot with the silicone compound, which enables to provide a wavelength conversion material with high properties and reliability. Further, according to the quantum dot surface treatment apparatus of the present invention, even in the case of performing quantum dot surface treatment using a large amount of solution, it is possible to stably coat the surface of the quantum dot with the silicone compound.

BRIEF DESCRIPTION OF DRAWINGS

FIG. 1 illustrates a specific example of a quantum dot surface treatment apparatus according to the present invention.

DESCRIPTION OF EMBODIMENTS

Hereinafter, the present invention will be described in detail; however, the present invention is not limited thereto.

As described above, the present inventors have found a method capable of efficiently manufacturing a highly reliable and stable quantum dot through coating of a quantum dot surface under mild conditions that have less impact on emission behaviors such as quantum efficiency and emission wavelength and that do not cause deterioration of the quantum dot, by using a manufacturing method of a quantum dot-containing polymer that includes mixing a solution in which a quantum dot is dispersed and a compound containing a ligand having a reactive substituent, performing a ligand exchange step of coordinating the ligand having the reactive substituent to an outermost surface of the quantum dot, subsequently adding a silicone compound containing a substituent polymerizable with the reactive substituent to the solution containing the quantum dot in which the reactive substituent is coordinated to the outermost surface and mixing them, then performing a polymerization step of allowing the quantum dot and the silicone compound to undergo a polymerization to synthesize a quantum dot-containing polymer.

However, it has been revealed that if a reaction is performed using this method with an increased amount of solution in order to increase the throughput, a new problem that the surface is not completely coated occurs. Thus, it has been required to enhance stability of a quantum dot and improve its compatibility with a resin material to thereby enhance its properties and reliability as a wavelength conversion material, and allow mass production to enhance productivity.

As a result of the present inventors having conducted earnest examination against these problems, it has been found that in the polymerization step, if the solution amount is about several tens of mL, the process can be performed in the flask container without problems, whereas if the solution amount is several hundred mL or more, the photopolymerization reaction occurs unevenly throughout the solution, so that the coating of the quantum dot surface with the silicone compound does not proceed uniformly, deteriorating the stability of the quantum dot and the compatibility with the resin. This is caused by the fact that the quantum dot strongly absorbs UV light for performing a photoreaction by itself.

Thus, it has been found that, by continuously supplying a solution containing a quantum dot having a surface to which a ligand having a coordinating substituent and a reactive substituent is coordinated by virtue of the coordinating substituent and a silicone compound polymerizable with the reactive substituent, to a flow path made of a material that transmits light for use in a photoreaction, and performing a photopolymerization reaction, even in the case of performing treatment of a large amount of solution, it is possible to uniformly and stably coat the quantum dot surface with the silicone compound and obtain high productivity.

That is, the present inventors have found that, by using a quantum dot surface treatment method comprising continuously supplying a solution containing a silicone compound and a quantum dot having a surface to which a ligand having a coordinating substituent and a reactive substituent is coordinated by virtue of the coordinating substituent, to a reaction flow path made of a material that transmits light, and emitting light to the reaction flow path, so that the silicone compound and the reactive substituent undergo a photopolymerization reaction, thereby coating the surface of the quantum dot with the silicone compound, even in the case of performing surface treatment using a large amount of solution, it is possible to stably coat the surface of the quantum dot with the silicone compound, which enables to provide a wavelength conversion material with high reliability, and the present inventors have completed the present invention.

Further, the present inventors have found that, by using a quantum dot surface treatment apparatus comprising: a solution supplying unit capable of adjusting a supply flow rate of a solution containing a quantum dot and a reactive compound that reacts with a surface of the quantum dot; a light source that emits light for allowing the quantum dot and the reactive compound to undergo a photoreaction; and a reaction flow path that allows the quantum dot and the reactive compound in the solution supplied by the solution supplying unit to undergo a photoreaction therein, the reaction flow path being made of a material capable of transmitting light emitted from the light source, even in the case of performing surface treatment using a large amount of solution as a raw material, it is possible to stably coat the surface of the quantum dot with the silicone compound, and the present inventors have completed the present invention.

It should be noted that the quantum dot surface treatment method and the quantum dot surface treatment apparatus according to the present invention have been invented in order to solve problems especially in the case of performing treatment of a large amount of solution; however, it is apparent that coating of a quantum dot surface with a silicone compound can be stably performed even in the treatment of a small amount of solution, and it is needless to say that the present invention is not limited by the amount of solution to be treated.

Hereinafter, the present invention will be described in detail.

First, a description will be given of a quantum dot whose surface is coated with a silicone compound which can be obtained by a quantum dot (hereinafter sometimes called a "QD") surface treatment method according to the present invention (hereinafter sometimes called a "quantum dot-containing polymer").

[Quantum Dot-Containing Polymer]

The quantum dot-containing polymer that can be obtained by the quantum dot surface treatment method according to the present invention is the quantum dot whose surface is coated with a silicone compound (sometimes called polysiloxane).

(Quantum Dot)

The composition and the like of the quantum dot are not particularly limited, and a quantum dot according to the purpose can be selected. Examples of the composition of the quantum dot include a II-IV group semiconductor, a III-V group semiconductor, a II-VI group semiconductor, a I-III-VI group semiconductor, a II-IV-V group semiconductor, a IV group semiconductor, and a perovskite-type semiconductor. Further, the quantum dot may have only a core or a core-shell structure. The particle diameter of the quantum dot may be selected as appropriate in accordance with the target wavelength range.

Specifically, examples of the core material include CdSe, CdS, CdTe, InP, InAs, InSb, AlP, AlAs, AlSb, ZnSe, ZnS, ZnTe, $Zn_3P_2$, GaP, GaAs, GaSb, $CuInSe_2$, $CuInS_2$, $CuInTe_2$, $CuGaSe_2$, $CuGaS_2$, $CuGaTe_2$, $CuAlSe_2$, $CuAlS_2$, $CuAlTe_2$, $AgInSe_2$, $AgInS_2$, AgInTe, $AgGaSe_2$, $AgGaS_2$, $AgGaTe_2$, PbSe, PbS, PbTe, Si, Ge, graphene, $CsPbCl_3$, $CsPbBr_3$, $CsPbI_3$, $CH_3NH_3PbCl_3$, a mixed crystal thereof, and one obtained by adding a dopant.

Examples of the shell material in the case of a core-shell structure include ZnO, ZnS, ZnSe, ZnTe, CdS, CdSe, CdTe, AlN, AlP, AlAs, AlSb, GaN, GaP, GaAs, GaSb, InN, InP, InAs, AlSb, BeS, BeSe, BeTe, MgS, MgSe, MgTe, PbS, PbSe, PbTe, SnS, SnSe, SnTe, CuF, CuCl, CuBr, CuI, and a mixed crystal thereof.

Further, the shape of the quantum dot is not particularly limited and can be freely selected according to the purpose. The shape of the quantum dot may be spherical, cubic, or rod-shaped. Further, the average particle diameter of the quantum dot is not particularly limited but is preferably 20 nm or less. The average particle diameter in such a range can achieve stable quantum size effects and a high emission efficiency and also facilitates control of the band gap with the particle diameter. It should be noted that the particle diameter of the quantum dot can be calculated from an average value of maximum diameters in a predetermined direction, that is, Feret diameter, of 20 or more particles, by measuring a particle image obtained by a transmission electron microscope (TEM). Of course, the method of measuring the average particle diameter is not limited to this, and other methods can be used for the measurement.

The quantum dot according to the present invention has a ligand having a coordinating substituent and a reactive substituent, on its surface. The structure of the ligand is not particularly limited but preferably has 20 or less of straight chain. With such a ligand, the amount of the ligand that is coordinated to the surface of the quantum dot is sufficient, and the amount that can then polymerize and interact with the silicone compound is also sufficient.

The coordinating substituent is preferably one or more kinds of an amino group, a thiol group, a carboxyl group, a phosphino group, and a quaternary ammonium salt. Such a coordinating substituent has excellent coordinating properties to the quantum dot surface, is highly effective in suppressing desorption of the ligand from the quantum dot, and enables a stable and high reaction with the silicone compound.

The reactive substituent is preferably one or more kinds of a vinyl group, an acrylic group, a methacryl group, a thiol group, an epoxy group, and an oxetanyl group. Such a reactive substituent enables a stable and high reaction with the silicone compound.

Further, the quantum dot surface may include a ligand other than the one described above. The kind of such a ligand is not particularly limited, and examples thereof include oleic acid, stearic acid, palmitic acid, myristic acid, lauric acid, decanoic acid, octanoic acid, oleylamine, stearyl (octadecyl)amine, dodecyl(lauryl)amine, decylamine, octylamine, octadecanethiol, hexadecanethiol, tetradecanethiol, dodecanethiol, decanethiol, octanethiol, trioctylphosphine, trioctylphosphine oxide, triphenylphosphine, triphenylphosphine oxide, tributylphosphine, and tributylphosphine oxide.

(Silicone Compound)

The silicone compound (polysiloxane) for coating the surface of the quantum dot is not particularly limited as long as it is a silicone compound having a polymerizable substituent capable of reacting with a ligand having a reactive substituent. The silicone compound is preferably liquid or oily from the viewpoint of compatibility between the ligand-coordinated quantum dot and the hydrophobic solvent and uniform reaction before polymerization. The silicone compound may have at least one polymerizable substituent on either or both of the molecular chain terminal and the side chain. Such a silicone compound is preferably vinyl-modified silicone oil, acrylic-modified silicone oil, methacryl-modified silicone oil, or the like. The modified silicone oil is not particularly limited, and several kinds of modified silicone oils may be mixed as long as aggregation or the like does not occur from the viewpoint of compatibility.

(Wavelength Conversion Material Having Quantum Dot-Containing Polymer)

The wavelength conversion material according to the present invention is a resin composition obtained by containing the quantum dot-containing polymer according to the present invention and being dispersed in a resin. The resin material is not particularly limited but is preferably one that does not cause aggregation and deterioration of the fluorescence emission efficiency in the quantum dot-containing polymer, and examples thereof include a silicone resin, an acrylic resin, an epoxy resin, a urethane resin, and a fluorine resin. These materials preferably have a high transmittance, particularly preferably a transmittance of 70% or more, in order to increase the fluorescence emission efficiency as a wavelength conversion material. Further, the configuration of the wavelength conversion material according to the present invention is not particularly limited, and an example thereof is a wavelength conversion film in which the quantum dot-containing polymer is dispersed in a resin.

[Surface Treatment Apparatus]

First, with reference to the drawing, a description will be given of the quantum dot surface treatment apparatus according to the present invention that is used for the surface treatment method as described above for obtaining the quantum dot (quantum dot-containing polymer) whose surface is coated with the silicone compound.

FIG. 1 illustrates a specific example of the quantum dot surface treatment apparatus according to the present invention. A quantum dot surface treatment apparatus 10 illustrated in FIG. 1 includes at least a light source 1, a reaction flow path 2, and a solution supplying unit 3. The solution supplying unit 3 is capable of adjusting a supply flow rate of a solution containing a quantum dot and a reactive compound that reacts with a surface of the quantum dot. The light source 1 emits light for allowing the quantum dot and the reactive compound in the solution to undergo a photoreaction. The reaction flow path 2 allows the quantum dot and the reactive compound in the solution supplied by the solution supplying unit 3 to undergo a photoreaction therein and is made of a material capable of transmitting light emitted from the light source 1. With such a surface treatment apparatus, even in the case of performing surface treatment using a large amount of solution, it is possible to stably coat the surface of the quantum dot with the silicone compound.

It should be noted that as illustrated in FIG. 1, a container 6B containing a pre-reaction solution 6A containing the quantum dot and the reactive compound can be connected to the reaction flow path 2 via a solution supplying tube 4 and the solution supplying unit 3, and the downstream of the reaction flow path 2 can be connected to a container 7B containing a post-reaction solution 7A via a solution discharging tube 5 that discharges the solution after the reaction, but the configuration of the quantum dot surface treatment apparatus 10 is not limited to this. For example, instead of only one reaction flow path 2, a plurality of the reaction flow paths 2 may be present in parallel to the light source 1. As the pre-reaction solution 6A, one obtained by mixing the quantum dot and the reactive compound in advance may be used, or one obtained by supplying the quantum dot and the reactive compound separately and then mixing them before supplying them to the reaction flow path 2 may be used, and in this case, a plurality of solution supplying units may be provided separately.

The light source 1 is not particularly limited as long as it can emit light capable of allowing the quantum dot and the reactive compound to undergo a photopolymerization reaction. The wavelength, intensity, and light irradiation area of the light used for the photopolymerization reaction are not particularly limited and can be changed as appropriate in accordance with the conditions required for the intended reaction. For example, it can be a light source capable of emitting UV light.

The material that forms the reaction flow path 2 is not particularly limited as long as it is a material capable of transmitting light that is emitted from the light source 1 and used for the photopolymerization reaction. For example, in the case of using a light source that emits UV light, a quartz material with a high transmittance for UV light is particularly preferable. The length of the reaction flow path 2 and the size in the light transmission direction can be set as appropriate within a range in which light can sufficiently reach the solution inside. When the transmittance of the light that transmits through the reaction flow path 2 is at least 0.1% or more, sufficient light is emitted to the solution, so that a more stable and uniform reaction can be performed. However, as described later, the transmittance of the light in the reaction flow path 2 depends on not only the material of the reaction flow path 2 but also the concentration of the quantum dot and the reactive compound in the solution; accordingly, it can be set such that at least 0.1% or more of the light incident on the reaction flow path 2 is transmitted, for example, by using a tubular reaction flow path and setting the concentration of the solution in accordance with the diameter of the reaction flow path, or conversely setting the diameter of the reaction flow path in accordance with the concentration of the solution.

The solution supplying tube 4 and the solution discharging tube 5 are not particularly limited as long as they are chemically stable with respect to the solution to which the reaction is performed, and examples thereof include a Teflon (registered trademark) tube, a silicone tube, and a urethane tube.

Further, the solution supplying unit 3 capable of adjusting the supply flow rate can be selected as appropriate from a tubing pump, a plunger pump, a means for pressure-feeding an inert gas adjusted by a flow meter, or the like, according to the amount of liquid to be supplied, the diameters of the solution supplying tube 4 and the solution discharging tube 5, and the like.

[Manufacturing Method of Quantum Dot-Containing Polymer]

Next, a description will be given of a manufacturing method of the quantum dot-containing polymer that includes surface treatment of the quantum dot according to the present invention.

(Preparation for Quantum Dot)

First, a quantum dot as described above is prepared. The manufacturing method of the quantum dot is not particularly limited.

(Ligand Exchange)

Next, a ligand having a coordinating substituent and a reactive substituent is coordinated to a surface of the prepared quantum dot by virtue of the coordinating substituent. For example, a quantum dot in which a ligand containing long-chain hydrocarbon is coordinated is dispersed in a hydrophobic solvent and mixed with a ligand having a coordinating substituent and a reactive substituent for ligand exchange. In the ligand exchange reaction, conditions such as the amount of addition, heating temperature, time, and light irradiation can be changed as appropriate depending on the type of ligand. It should be noted that if the ligand remaining after the ligand exchange or the ligand that has been removed affects the photopolymerization with a silicone compound such as modified silicone oil, it is preferable to purify the ligand once.

(Surface Treatment of Quantum Dot)

Next, the quantum dot obtained through the ligand exchange as described above so that the ligand having a coordinating substituent and a reactive substituent is coordinated to the surface by virtue of the coordinating substituent is dispersed in a solvent, and a silicone compound having a photopolymerizable substituent, such as modified silicone oil, is added and mixed to obtain a solution. Examples of the solvent include pentane, hexane, octane, benzene, toluene, and octadecene, but the solvent is not limited thereto.

Further, a photopolymerization initiator is preferably added to the solvent described above. The photopolymerization initiator, the quantum dot in which the ligand having a polymerizable reactive substituent is coordinated, and the silicone compound having a polymerizable substituent are mixed and stirred to be uniformly mixed in a hydrophobic solvent and then irradiated with light such as ultraviolet rays, so that a photopolymer can be prepared quickly. By carrying out the polymerization reaction through light irradiation in this way, it is possible to obtain a quantum dot-containing polymer in which the surface of the quantum dot is coated with the silicone compound.

Examples of the photopolymerization initiator include, for the Irgacure (registered trademark) series commercially available from IGM resins, for example, Irgacure 290, Irgacure 651, Irgacure 754, Irgacure 184, Irgacure 2959, Irgacure 907, Irgacure 369, Irgacure 379, Irgacure 819, Irgacure 1173, and the like. For the Darocure (registered trademark) series, for example, TPO, Darocure 1173, and the like can be mentioned. In addition, a known radical polymerization initiator or cationic polymerization initiator may be included. The content of the photopolymerization initiator is preferably 0.1 to 10 parts by mass, more preferably 0.2 to 5 parts by mass, per 100 parts by mass of the modified silicone oil to be added.

Here, in the present invention, a quantum dot having a surface in which a ligand having a coordinating substituent and a reactive substituent is present, and a solution containing a silicone compound or the like polymerizable with the reactive substituent are continuously supplied to a reaction flow path made of a material that transmits light for use in a photopolymerization reaction to perform a reaction. Such surface treatment can be performed using the surface treatment apparatus illustrated in FIG. 1. Thus, even in the case of scaling up the reaction system and performing treatment of a large amount of solution, the photopolymerization reaction can be uniformly performed in the entire solution, which enables to uniformly proceed the coating of the quantum dot surface with the silicone compound, and even if the amount of solution to be used for the polymerization step is increased, it is possible to uniformly coat the quantum dot surface with the silicone compound due to enhancement of stability of the quantum dot and suppression of deterioration of the compatibility with the resin, with high productivity.

Further, the concentration of the solution and the size of the flow path are preferably adjusted such that the transmittance of the light that transmits through the reaction flow path from the side to be irradiated with light to the opposite side is at least 0.1% or more. Setting such a condition ensures that the reaction occurs uniformly in the light irradiation area. The reaction flow path is preferably tubular, and the transmittance can be adjusted by adjusting the concentration of the solution and/or the diameter of the reaction flow path. A method of determining the transmittance includes a method of direct measurement on the flow path, or a method of measuring the absorbance (transmittance) at the wavelength of the light source from the measurement of the visible ultraviolet absorption spectrum of the reaction solution and calculating the Lambert-Beer law $A=\alpha LC$, (A: absorbance, $\alpha$=absorption coefficient, L: optical path length, C: concentration) to obtain the concentration and the flow path diameter.

(Manufacture of Wavelength Conversion Material Having Quantum Dot-Containing Polymer)

The manufacturing method of the wavelength conversion material is not particularly limited, and a wavelength conversion film in which the quantum dot-containing polymer is dispersed in a resin can be obtained by processing into a sheet and then curing. For example, the wavelength conversion material can be obtained by dispersing the quantum dot-containing polymer in an acrylic resin, applying the resin composition to a transparent film such as PET or polyimide, and curing the resultant, followed by lamination process. For the application to the transparent film, a spray method with a spray, an inkjet, or the like, spin coating, or a bar coater can be used.

The method of curing the resin composition is not particularly limited, and it can be performed by, for example, heating the film coated with the resin composition at 60° C. for 2 hours and then heating it at 150° C. for 4 hours. Further, the resin composition may be cured using a photopolymerization reaction, which can be changed as appropriate in accordance with the application.

EXAMPLE

Hereinafter, the present invention will be specifically described with reference to examples; however, this description is not intended to limit the present invention.

In Examples and Comparative Examples described below, InP/ZnSe/ZnS core-shell type quantum dots were used as quantum dot materials. The fluorescence emission properties of the quantum dots (quantum dot-containing polymers) obtained through the surface treatment were evaluated using the quantum efficiency measurement system (QE-2100) manufactured by Otsuka Electronics Co., Ltd., to measure the emission wavelength, fluorescence emission half width, and fluorescence emission efficiency (internal quantum efficiency) of the quantum dots at an excitation wavelength of 450 nm.

Comparative Example 1

(Quantum Dot Core Synthesis Step)

0.23 g (0.9 mmol) of palmitic acid, 0.088 g (0.3 mmol) of indium acetate, and 10 mL of 1-octadecene were added to a flask, heated and stirred at 100° C. under reduced pressure, and degassed for 1 hour while dissolving the raw materials. Thereafter, nitrogen was purged into the flask, and 0.75 mL (0.15 mmol) of a solution prepared by mixing tristrimethylsilylphosphine with trioctylphosphine and adjusted to 0.2 M was added, followed by raising the temperature to 300° C., then it was confirmed that the solution has changed from yellow to red and core particles were formed.

(Quantum Dot Shell Layer Synthesis Step)

Next, 2.85 g (4.5 mmol) of zinc stearate and 15 mL of 1-octadecene were added to another flask, heated to 100° C. and stirred under reduced pressure, and degassed for 1 hour while being dissolved to prepare 0.3 M of octadecene zinc stearate solution, then 3.0 mL (0.9 mmol) of the solution was added to the reaction solution after core synthesis and cooled to 200° C. Next, 0.474 g (6 mmol) of selenium and 4 mL of trioctylphosphine were added to another flask and dissolved by heating to 150° C. to prepare 1.5 M of selenium trioctylphosphine solution, then while the temperature of the reaction solution after the core synthesis step which had been cooled to 200° C. was raised to 320° C. over 30 minutes, a total of mL (0.9 mmol) of the selenium trioctylphosphine solution was added in increments of 0.1 mL and held at 320° C. for 10 minutes, followed by cooling to room temperature. 0.44 g (2.2 mmol) of zinc acetate was added and dissolved by heating to 100° C. and stirring under reduced pressure. The inside of the flask was purged with nitrogen again, then the temperature was raised to 230° C., and 0.98 mL (4 mmol) of 1-dodecanethiol was added and held for 1 hour. The resultant solution was cooled to room temperature to prepare a core-shell type quantum dot-containing solution made of InP/ZnSe/ZnS.

(Ligand Exchange Step)

As the ligand having a coordinating substituent and a reactive substituent, 2-propene-1-thiol (Tokyo Chemical Industry Co., Ltd.) was used. As the ligand exchange reaction, the solution after the shell layer synthesis step which had been cooled to room temperature was heated to 60° C., and 0.08 mL (1.0 mmol) of 2-propene-1-thiol was added and stirred for 1 hour. After completion of the reaction, the resultant solution was cooled to room temperature, and ethanol was added to precipitate the reaction solution and centrifuged to remove the supernatant. Similar purification was performed once more, followed by dispersion in toluene, to prepare a quantum dot solution in which the ligand having a reactive substituent is coordinated to the outermost surface.

(Surface Treatment Step/Synthesis of Quantum Dot-Containing Polymer)

20 mL of the quantum dot toluene solution (QD concentration 7% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. After stirring, mixing, and defoaming, the mixture was irradiated with light having a wavelength of 365 nm and an output of 4000 mW/cm² for 20 seconds by means of a UV-LED irradiation apparatus while being stirred. After completion of the reaction, ethanol was added for precipitation, and after being centrifuged, the supernatant was removed and dispersed in toluene again to obtain a quantum dot-containing composition. As a result of measurement of the emission wavelength, fluorescence emission half width, and fluorescence emission efficiency (internal quantum efficiency) of this quantum dot, the emission wavelength was 533 nm, the half width was 40 nm, and the internal efficiency was 69%.

(Manufacturing Method of Wavelength Conversion Material)

The obtained quantum dot-containing composition was used to prepare a wavelength conversion material. 1.0 g of a 1.0% by mass toluene solution of the quantum dot-containing polymer was mixed with 10.0 g of a silicone resin (LPS-5547 manufactured by Shin-Etsu Chemical Co., Ltd.) and heated at 60° C. while being stirred to remove the solvent under reduced pressure. Then, the resultant was subjected to vacuum degassing and applied onto a polyethylene terephthalate (PET) film with a thickness of 50 μm, and a semiconductor nanoparticle resin layer with a thickness of 100 μm was formed using a bar coater. Further, a PET film was laminated on this resin layer for lamination process. This film was heated at 60° C. for 2 hours, then heated at 150° C. for 4 hours to cure the semiconductor nanoparticle resin layer, preparing a wavelength conversion material. As a result of observation of the prepared wavelength conversion material with an optical microscope, it could be confirmed that there were no aggregates of quantum dots and that the quantum dots and the resin had good compatibility. As a result of measurement of the emission wavelength, fluorescence emission half width, and fluorescence emission efficiency (internal quantum efficiency) of this wavelength conversion material, the emission wavelength was 534 nm, the half width was 41 nm, and the internal quantum efficiency was 52%.

(Reliability Test)

The obtained wavelength conversion material was treated for 250 hours under conditions of 85° C. and 85% RH (relative humidity), and the fluorescence emission efficiency of the treated wavelength conversion material was measured to evaluate the reliability. As a result of measurement of the emission wavelength, fluorescence emission half width, and fluorescence emission efficiency (internal quantum efficiency) of this wavelength conversion material after the treatment for 250 hours, the emission wavelength was 534 nm, the half width was 41 nm, and the internal quantum efficiency was 49%. The rate of change in quantum efficiency through the reliability test was about 6%, so that it was confirmed that even in the comparative example, with small-scale processing, quantum dots in the wavelength conversion material have high stability.

In Examples 1 to 5 and Comparative Example 2, which will be described next, the amount of treatment was increased compared to Comparative Example 1, and the conditions of the surface treatment step were changed, then the same evaluation as in Comparative Example 1 was performed. In Examples 1 to 5, quantum dot surface treatment (photopolymerization reaction with silicone oil) was performed using a surface treatment apparatus as illustrated in FIG. 1.

Example 1

In the surface treatment step (quantum dot-containing polymer synthesis), 200 mL of the quantum dot toluene solution (QD concentration 7% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added in an amount of 1 part by mass per 100 parts by mass of the silicone oil. After stirring, mixing, and defoaming these, quantum dot surface treatment (photopolymerization reaction with the silicone oil) was performed using a UV-LED irradiation apparatus and a surface treatment apparatus having a quartz flow path with a flow path diameter of 2 mm and a light irradiation area of 120 mm. The light transmittance of the quartz flow path at this time was 0.4%. While flowing the solution at a flow rate of 5 mL/min by pressure feeding of nitrogen gas, the solution was irradiated with light having a wavelength of 365 nm and an output of 500 mW/cm$^2$ by means of the UV-LED irradiation apparatus. After completion of the reaction, ethanol was added for precipitation, and after being centrifuged, the supernatant was removed and dispersed in toluene again to obtain a quantum dot-containing polymer.

Example 2

In the surface treatment step (quantum dot-containing polymer synthesis), 200 mL of the quantum dot toluene solution (QD concentration 8% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added in an amount of 1 part by mass per 100 parts by mass of the silicone oil. After stirring, mixing, and defoaming these, quantum dot surface treatment (photopolymerization reaction with the silicone oil) was performed using a UV-LED irradiation apparatus and a surface treatment apparatus having a quartz flow path with a flow path diameter of 2 mm and a light irradiation area of 120 mm. The light transmittance of the quartz flow path at this time was 0.1%. While flowing the solution at a flow rate of 5 mL/min by pressure feeding of nitrogen gas, the solution was irradiated with light having a wavelength of 365 nm and an output of 500 mW/cm$^2$ by means of the UV-LED irradiation apparatus. After completion of the reaction, ethanol was added for precipitation, and after being centrifuged, the supernatant was removed and dispersed in toluene again to obtain a quantum dot-containing polymer.

Example 3

In the surface treatment step (quantum dot-containing polymer synthesis), 200 mL of the quantum dot toluene solution (QD concentration 7% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added to another flask which had been purged with nitrogen in advance, in an amount of 1 part by mass per 100 parts by mass of the silicone oil. After stirring, mixing, and defoaming these, quantum dot surface treatment (photopolymerization reaction with the silicone oil) was performed using a UV-LED irradiation apparatus and a surface treatment apparatus having a quartz flow path with a flow path diameter of 2 mm and a light irradiation area of 120 mm and a mixer section for mixing the solution. The light transmittance of the quartz flow path at this time was 0.4%. The quantum dot solution was flowed at a flow rate of 5 mL/min and the silicone oil solution was flowed at a flow rate of 0.1 mL/min by pressure feeding of nitrogen gas, and after mixing the two solutions with the mixer in the line, the mixture was sent to the light irradiation area and irradiated with light having a wavelength of 365 nm and an output of 500 mW/cm$^2$ by means of the UV-LED irradiation apparatus. After completion of the reaction, ethanol was added for precipitation, and after being centrifuged, the supernatant was removed and dispersed in toluene again to obtain a quantum dot-containing polymer.

Comparative Example 2

In the surface treatment step (quantum dot-containing polymer synthesis), 200 mL of the quantum dot toluene solution (QD concentration 7% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added in an amount of 1 part by mass per 100 parts by mass of the silicone oil. After stirring, mixing, and defoaming, the mixture was irradiated with light having a wavelength of 365 nm and an output of 4000 mW/cm$^2$ for 200 seconds by means of a UV-LED irradiation apparatus while being stirred. After completion of the reaction, ethanol was added for precipitation, and after being centrifuged, the supernatant was removed and dispersed in toluene again to obtain a quantum dot-containing polymer.

Example 4

In the surface treatment step (quantum dot-containing polymer synthesis), 200 mL of the quantum dot toluene solution (QD concentration 7% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added in an amount of 1 part by mass per 100 parts by mass of the silicone oil. After stirring, mixing, and defoaming these, quantum dot surface treatment (photopolymerization reaction with the silicone oil) was performed using a UV-LED irradiation apparatus and a surface treatment apparatus having a quartz flow path with a flow path diameter of 3 mm and a light irradiation area of 120 mm. The light transmittance of the quartz flow path at this time was 0.02%. While flowing the solution at a flow rate of 5 mL/min by pressure feeding of nitrogen gas, the solution was irradiated with light having a wavelength of 365 nm and an output of 500 mW/cm$^2$ by means of the UV-LED irradiation apparatus. After completion of the reaction, ethanol was added for precipitation, and after being centrifuged, the supernatant was removed and dispersed in toluene again to obtain a quantum dot-containing polymer.

Example 5

In the surface treatment step (quantum dot-containing polymer synthesis), 200 mL of the quantum dot toluene solution (QD concentration 10% by mass) after the ligand exchange step was added to a flask which had been purged with nitrogen in advance, and methacryl-modified silicone oil X-32-3817-3 (Shin-Etsu Chemical Co., Ltd.) was added in an amount of 2 parts by mass per 100 parts by mass of the quantum dot toluene solution. Further, as a photopolymerization initiator, Irgacure 1173 (IGM resins B.V.) was added in an amount of 1 part by mass per 100 parts by mass of the silicone oil. After stirring, mixing, and defoaming these, quantum dot surface treatment (photopolymerization reaction with the silicone oil) was performed using a UV-LED irradiation apparatus and a reaction apparatus having a quartz flow path with a flow path diameter of 2 mm and a light irradiation area of 120 mm. The light transmittance of heated at 150° C. for 4 hours to cure the semiconductor nanoparticle resin layer, preparing a wavelength conversion material.

The obtained wavelength conversion material was treated for 250 hours under conditions of 85° C. and 85% RH (relative humidity), and the fluorescence emission efficiency of the treated wavelength conversion material was measured to evaluate the reliability.

Table 1 indicates values of the surface treatment conditions of Examples 1 to 5 and Comparative Examples 1 and 2, the fluorescence emission efficiencies after preparation of the quantum dots and the wavelength conversion materials, and the fluorescence emission efficiencies after the reliability evaluation.

TABLE 1

| | | Comp. Ex. 1 | Ex. 1 | Ex. 2 | Ex. 3 | Comp. Ex. 2 | Ex. 4 | Ex. 5 |
|---|---|---|---|---|---|---|---|---|
| Condition | Amount of Treatment (mL) | 20 | 200 | 200 | 200 | 200 | 200 | 200 |
| | Light Transmittance of Reaction Flow Path during Polymerization Reaction (%) | — | 0.4 | 0.1 | 0.4 | — | 0.02 | 0.04 |
| Quantum Dot | Wavelength (nm) | 533 | 532 | 533 | 534 | 532 | 533 | 533 |
| | Half Width (nm) | 40 | 41 | 40 | 40 | 40 | 40 | 41 |
| | Internal Quantum Efficiency (%) | 69 | 70 | 68 | 70 | 71 | 68 | 68 |
| Wavelength Conversion Material | Wavelength (nm) | 534 | 533 | 533 | 534 | 544 | 540 | 539 |
| | Half Width (nm) | 41 | 41 | 40 | 41 | 45 | 44 | 45 |
| | Internal Quantum Efficiency (%) | 52 | 53 | 50 | 53 | 40 | 46 | 40 |
| | Presence of Aggregation (*) | None | None | None | None | Many | Few | Few |
| Reliability Test | Wavelength (nm) | 534 | 533 | 535 | 534 | 549 | 546 | 543 |
| | Half Width (nm) | 41 | 41 | 40 | 40 | 48 | 47 | 47 |
| | Internal Quantum Efficiency (%) | 49 | 51 | 46 | 48 | 29 | 39 | 31 |
| | Rate of Change in Internal Quantum Efficiency (%) | 6% | 4% | 8% | 9% | 28% | 15% | 23% |

*Presence of Aggregation: None, Few, Many the quartz flow path at this time was 0.04%. While flowing the solution at a flow rate of 5 mL/min by pressure feeding of nitrogen gas, the solution was irradiated with light having a wavelength of 365 nm and an output of 500 mW/cm² by means of the UV-LED irradiation apparatus. After completion of the reaction, ethanol was added for precipitation, and after being centrifuged, the supernatant was removed and dispersed in toluene again to obtain a quantum dot-containing polymer.

The quantum dot-containing polymers obtained in Examples 1 to 5 and Comparative Example 2 were used to each prepare a wavelength conversion material. 1.0 g of a 1.0% by mass toluene solution of the quantum dot-containing polymer was mixed with 10.0 g of a silicone resin (LPS-5547 manufactured by Shin-Etsu Chemical Co., Ltd.) and heated at 60° C. while being stirred to remove the solvent under reduced pressure. Then, the resultant was subjected to vacuum degassing and applied onto a polyethylene terephthalate (PET) film with a thickness of 50 μm, and a semiconductor nanoparticle resin layer with a thickness of 100 μm was formed using a bar coater. Further, a PET film was laminated on this resin layer for the lamination process. This film was heated at 60° C. for 2 hours, then As indicated in Table 1, it can be seen that in Comparative Example 2, the internal quantum efficiency was significantly lowered during the preparation of the wavelength conversion material, and the emission wavelength was largely shifted to a longer wavelength. When observed using a microscope, many aggregates of about 10 to 50 μm were observed in Comparative Example 2, and as a result, it is considered that the internal quantum efficiency was lowered.

On the other hand, no aggregates were observed in Examples 1 to 3, and thus it is considered that the decrease in internal quantum efficiency was suppressed. Aggregates were slightly observed in Examples 4 and 5 but were fewer than in Comparative Example 2, and the decrease in internal quantum efficiency and the shift of the emission wavelength to a longer wavelength were suppressed. Thus, it can be seen that in Examples 1 to 5, since the coating with the silicone compound was stably performed, the compatibility with the resin was improved and aggregation was effectively suppressed.

Further, when comparing the results of the reliability test (85° C., 85% RH, 250 hours treatment), it can be seen that all of Examples 1 to 5 had more improved stability than Comparative Example 2. In particular, in Examples 1 to 3 in which the light transmittance of the quartz flow path during the surface treatment was set to 0.1% or more, it can be seen that the decrease in internal quantum efficiency was suppressed to 10% or less, and properties equivalent to those of small-scale processing as in Comparative Example 1 were obtained.

As described above, it could be confirmed that in the case of performing the coating treatment of the quantum dot surface with the silicone compound, the photopolymerization reaction is performed while the solution is flowed through the reaction flow path made of a material that transmits light as in Examples 1 to 5, so that the quantum dot coated with the silicone compound through the surface treatment shows high stability even if the amount of treatment of the quantum dot solution is increased, and in the wavelength conversion material using this, deterioration of the fluorescence emission efficiency is suppressed under high temperature and high humidity conditions and the reliability is high.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A quantum dot surface treatment method comprising continuously supplying a solution containing a silicone compound and a quantum dot having a surface to which a ligand having a coordinating substituent and a reactive substituent is coordinated by virtue of the coordinating substituent, to a reaction flow path made of quartz, and emitting light to the reaction flow path, so that the silicone compound and the reactive substituent undergo a photopolymerization reaction, thereby coating the surface of the quantum dot with the silicone compound, wherein the reaction flow path is tubular, a concentration of the solution and/or a diameter of the reaction flow path are adjusted such that a transmittance of the light that transmits through the reaction flow path is at least 0.1% or more, and wherein an amount of the solution containing the silicone compound and the quantum dot is 200 mL or more.

2. The quantum dot surface treatment method according to claim 1, wherein the coordinating substituent is one or more kinds of an amino group, a thiol group, a carboxyl group, a phosphino group, and a quaternary ammonium salt.

3. The quantum dot surface treatment method according to claim 2, wherein the reactive substituent is one or more kinds of a vinyl group, an acrylic group, a methacryl group, a thiol group, an epoxy group, and an oxetanyl group.

4. The quantum dot surface treatment method according to claim 1, wherein the reactive substituent is one or more kinds of a vinyl group, an acrylic group, a methacryl group, a thiol group, an epoxy group, and an oxetanyl group.

5. The quantum dot surface treatment method according to claim 1, wherein the coordinating substituent is one or more kinds of an amino group, a thiol group, a phosphino group, and a quaternary ammonium salt.

6. The quantum dot surface treatment method according to claim 1, wherein the reactive substituent is one or more kinds of a thiol group, an epoxy group, and an oxetanyl group.

7. The quantum dot surface treatment method according to claim 1, wherein the coordinating substituent is one or more kinds of an amino group, a thiol group, a phosphino group, and a quaternary ammonium salt, and wherein the reactive substituent is one or more kinds of a thiol group, an epoxy group, and an oxetanyl group.

8. The quantum dot surface treatment method according to claim 1, wherein the ligand is a straight chain having 20 or fewer carbons.

9. The quantum dot surface treatment method according to claim 1, wherein a concentration of the solution and/or a diameter of the reaction flow path are adjusted such that a transmittance of the light that transmits through the reaction flow path is 0.1% or more and 0.4% or less.

* * * * *